United States Patent

[11] 3,587,644

[72] Inventor George M. Whitehouse
 Wallingford, Conn.
[21] Appl. No. 751,920
[22] Filed Aug. 12, 1968
[45] Patented June 28, 1971
[73] Assignee Laboratory For Electronics, Inc.
 Boston, Mass.

[54] FOUR-WAY VALVE AND ACTUATOR
 4 Claims, 10 Drawing Figs.
[52] U.S. Cl. .................................... 137/624.13,
 137/624.18, 251/75, 74/84
[51] Int. Cl. ...................................... F16k 31/48
[50] Field of Search .......................... 137/624.13,
 624.11; 251/75; 74/84

[56] References Cited
UNITED STATES PATENTS
2,253,183 8/1941 Le Count ..................... 74/84X
2,367,319 1/1945 Wahlberg ..................... 137/624.13

Primary Examiner—Alan Cohan
Attorney—Joseph S. Iandiorio

ABSTRACT: Apparatus is disclosed for providing a variable output motion in response to a uniform input motion including a rotatable drive member for driving auxiliary drive means at a first speed during a first portion of a revolution of the drive member to load and then release energy storage means which upon its release drives the auxiliary drive means at an initially higher second speed during a second portion of a revolution.

GEORGE M. WHITEHOUSE
INVENTOR.

BY
Joseph S. Iandiorio
ATTORNEY.

GEORGE M. WHITEHOUSE
INVENTOR.

BY Joseph S. Iandiorio
ATTORNEY.

3,587,644

FOUR-WAY VALVE AND ACTUATOR

BACKGROUND OF INVENTION

This invention relates to actuator apparatus for providing variable output motion in response to uniform input motion, and more particularly to such actuator apparatus adaptable for driving a fast-acting four-way valve.

Many valve applications require a valve mechanism which can maintain a certain pattern of interconnection between its ports and can after a predetermined time interchange the interconnection of those ports very quickly. For example, in a particular dehydration system used to control the moisture content of air in coaxial cables, a four-way fast-acting valve is required cyclically to connect a first dehydrator chamber to the cable while connecting a second such chamber to an exhaust port. Under control of the valve actuating means the system dwells in such a position for a predetermined time and then quickly switches the connections to the dehydrator chambers and dwells again. The quick switching action is desirable to maintain flow continuity through the cable and prevent backflow.

SUMMARY OF INVENTION

It is therefore a primary object of this invention to provide a new actuator apparatus which is capable of producing variable output motion in response to uniform input motion.

It is a further object of this invention to provide such actuator apparatus adaptable for use with a valve mechanism to provide dwell periods separated by fast interchanging of the interconnections of the ports of the valve mechanism.

It is a further object of this invention to provide such actuator apparatus which is reliable, small, compact, inexpensive to make and use and of simple design.

DISCLOSURE OF PREFERRED EMBODIMENT

Other objects, features and advantages will occur from the following description of a preferred embodiment and the accompanying drawings, in which.

An embodiment of the invention may be constructed using a motor driven shaft having a driving member or pin rigidly mounted perpendicular to it. That pin contacts an auxiliary drive device including a pair of diametrically spaced rollers positioned parallel to each other and an output shaft on which they are mounted by an intermediate support element. Energy storage means such as a pair of spaced planar springs are arranged on diametrically opposite sides of the output shaft and are bowed inwardly toward that output shaft to a radial distance less than the radial distance of the rollers from that shaft. As the rollers are rotated about the output shaft axis by the driving pin they contact the springs and begin to load or compress the bowed springs by pushing the bowed portions radially outward. The rollers continue to be driven after the springs are fully compressed and eventually pass the center point of their respective springs. The springs release and drive the rollers with greater speed than the driving pin so that the driving pin is momentarily left behind. The rollers comes to rest while the driving pin continues to rotate at its normal speed. Eventually the driving pin again engages the rollers and begins to drive them to compress the springs. Each roller now compresses the spring compressed by the other roller during the previous compression and release operation.

The output shaft may be used to drive a valving member in a housing having four ports. The valving member has a first chamber connected to a first port and connectable to either of a second or third port. A second chamber formed between the valving member and the housing is connected to a fourth port and is connectable to one of the second or third ports not connected to the first port. The chambers are large enough or are elongated in the direction of motion of the valving member, so that they can maintain connection with a particular one of the second and third ports while the driving pin is rotating the rollers and output shaft during compression of the springs. Upon release the snap action quickly interchanges the connections of the first and fourth ports with the second and third ports.

Figure 1:
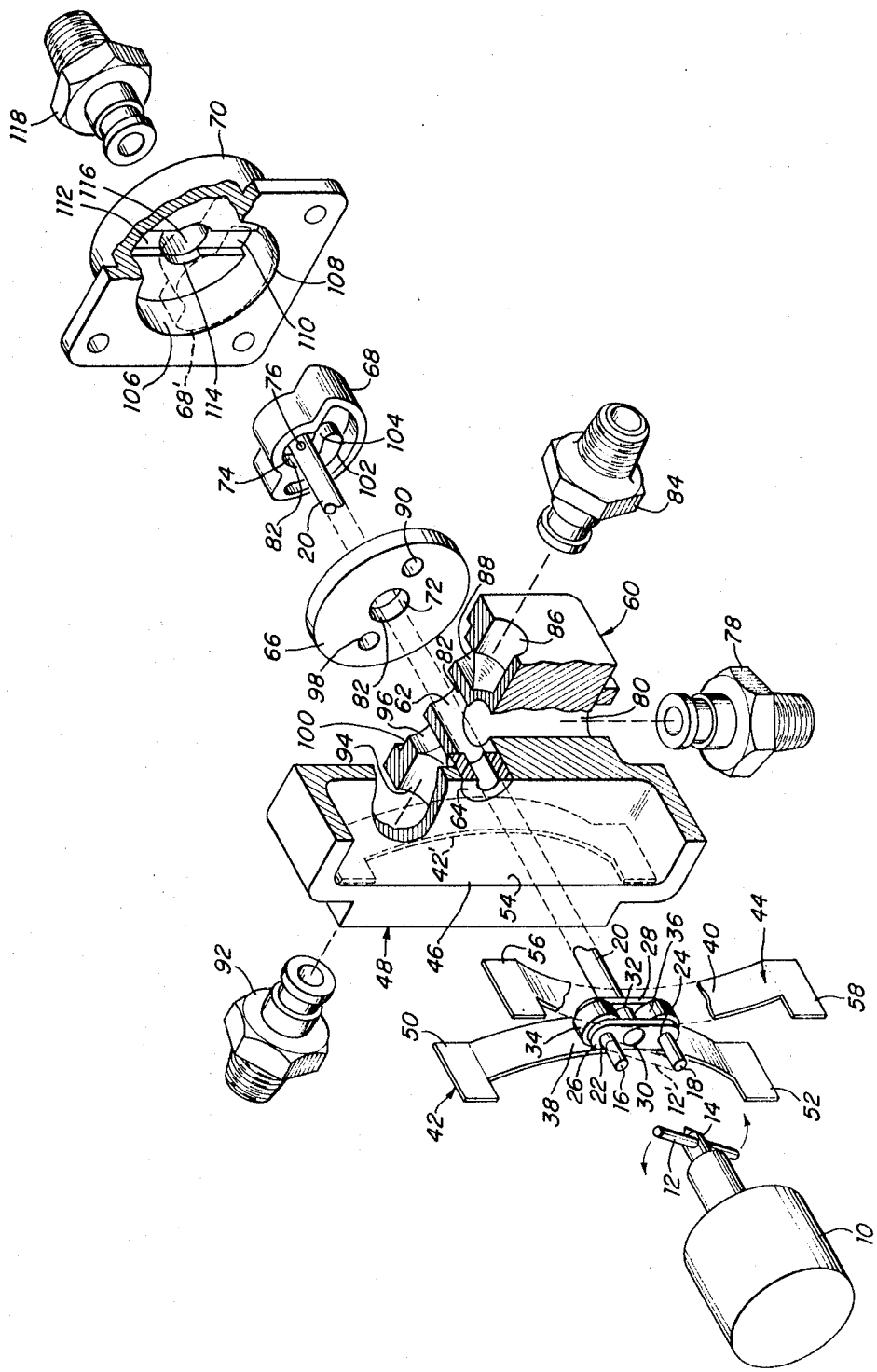
FIG. 1 is an exploded perspective view of an actuator and valve structure according to the invention wherein parts not essential to an understanding of the invention have been omitted and portions of parts included have been broken away.

One embodiment of the invention in which the actuator is used to drive a four-way valve is shown in FIG. 1, where a motor 10 provides uniform rotary motion to drive member or pin 12 mounted in input shaft 14. During a portion of a revolution pin 12, shown in phantom as 12′, bears against roller pins 16 and 18, and causes them and output shaft 20 to rotate about the axis of shaft 20. Roller pins 16 and 18 are mounted in holes 22, 24 in flanges 26 and similar holes (not shown) in flanges 28. Flanges 26 and 28 are fixed to, and receive, output shaft 20 in holes 30 and 32 respectively so that pins 16 and 18, flanges 26 and 28 and shaft 20 function as an auxiliary drive unit. As drive pin 12 rotates roller pins 16 and 18, rollers 34 and 36 mounted on pins 16 and 18 bear on the bowed portions 38, 40 of springs 42 and 44, respectively, loading or compressing them by pushing their bowed portions 38, 40 radially outward from shaft 20.

When rollers 34 and 36 fully compress bowed portions 38 and 40, further rotation of roller pins 16 and 18 causes rollers 34 and 36 to move over center on the bowed portions permitting the springs to release with a quick, snapping action and drive rollers 34 and 36 at a speed in excess of the speed of rotation of motor 10 so that roller pins 16 and 18 leave pin 12 behind. This operation is more fully explained in the discussion of FIGS. 2, 3, 4, and 5, infra. Springs 42 and 44 are mirror images of one another and are mounted in recess 46 of housing 48 so that they are simultaneously compressed by rollers 34 and 36 to provide their compressing resistance and release force in phase with each other. Spring 42 is mounted in recess 46, as shown by phantom spring 42′, in bowed fashion with its feet 50, 52 in engagement with the sidewall 54 of the recess. Spring 44 having feet 56, 58 is similarly mounted against the opposite sidewall in recess 46.

Output shaft 20 extends from recess 46 through the rear portion 60 of housing 48 through bore 62 and is supported therein by means of bearing 64. Rear portion 60, sealing plate 66, valving member 68 and cover plate 70 form a four-way valve mechanism which may be operated by output shaft 20 extending through port 72 in sealing plate 66 and into shallow bore 74 in valving member 68 to which it is fixed by pin 76. Bores 62 and 74 and port 72 are larger in diameter than shaft 20 so that a concentric valve passage is provided through them surrounding shaft 20.

One of the valve passages includes external fitting 78, bore 80 in rear portion 60 of housing 48, and the space 82 (numbered in three places) surrounding shaft 20 in bores 62 and 74 and port 72. A second valve passage includes external fitting 84, bores 86 and 88 in rear portion 60 of housing 48, and port 90 in sealing plate 66. A third valve passage includes external fitting 92, bores 94 and 96 in rear portion 60 of housing 48, and port 98 in sealing plate 66. Sealing plate 66 is seated in circular recess 100 so that ports 72, 90 and 98 mate with bores 62, 88, and 96 in rear portion 60 of housing 48.

The valve passage extending from fitting 78 to bore 74 communicates with arcuate chamber 102 in valving member 68 through radial chamber 104. As shaft 20 is driven by pin 12 bore 74 maintains connection with a particular one of ports 90 or 98 because of the extended arcuate shape of chamber 102, so that a path from fitting 78 through the valve to either of fittings 84 or 92 is maintained. As the end of chamber 102 approaches that particular port in sealing plate 66 rollers 34 and 36 pass over center on springs 42 and 44, which snap back, and quickly move valving member 68 so that chamber 102 now no longer communicates with that particular one of ports 90 and 98 but communicates with the other one of those ports. The one of ports 90 and 98 not communicating with chamber 102 in member 68 communicates with a generally semicylindrical chamber 106 formed between generally semicylindrical valving member 68 and cylindrical compartment 108 in cover plate 70, as demonstrated by the position of the phantom showing 68' of member 68. A pair of channels 110, 112 radially extending from port 114 at the inner end of bore 116 permit bore 116 to communicate with chamber 106 regardless of the orientation of member 68 as it rotates in compartment 108. External fitting 118 completes the fourth passage associated with the four-way valve mechanism. The sequence of valving operation is described more fully in the discussion of FIGS. 7, 8, 9, 10, and 11, infra.

Various details such as assembly bolts, seals, and the like have been omitted because they complicate the description and do not enhance understanding of the invention.

Figure 2:
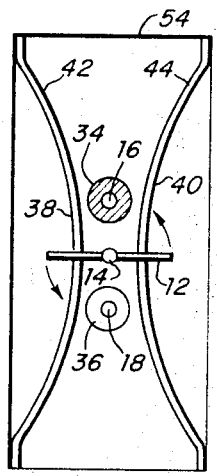
FIG. 2 is a schematic view of the actuator portion of FIG. 1 showing roller pins dwelling while the drive pin regains contact with them.
Figure 3:
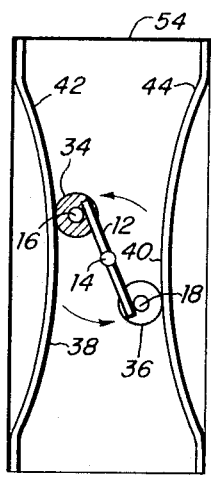
FIG. 3 is a schematic view similar to FIG. 2 in which the drive pin has engaged the roller pins and is causing the springs to be compressed.
Figure 4:
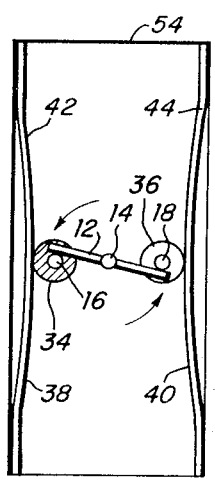
FIG. 4 is a schematic view similar to FIG. 3 in which the roller pins have fully compressed the springs and are passing over the center of the springs.
Figure 5:
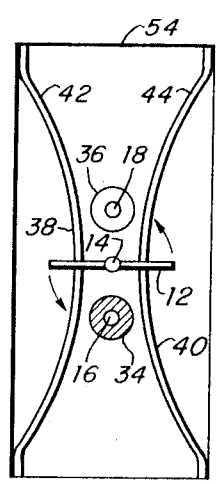
FIG. 5 is a schematic view similar to FIG. 4 in which the compressed springs have released and driven the roller pins ahead of the drive pin.
Figure 6:
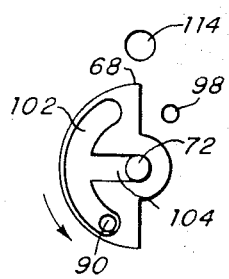
FIG. 6 is a schematic view of the valve portion of FIG. 1 showing the valving member in a dwell position.

The operation of the actuator portion of FIG. 1 is shown schematically in FIGS. 2—5 where like numbers refer to like parts in FIG. 1. A dwell portion of a revolution of shaft 14 is shown in FIG. 2 where pins 16 and 18 are disengaged with pin 12 and are at rest so output shaft 20, FIG. 1, is also at rest. As pin 12 and shaft 14 continue to rotate, pin 12 engages pins 16 and 18 and drives them with rotational motion about the common axis of shafts 14 and 20. During this drive portion of the revolution of shaft 14 rollers 34 and 36 come to bear on bowed portions 38 and 40 of springs 42 and 44, respectively, and begin to compress those springs, FIG. 3. Further rotation of shaft 14 and pin 12 effects an optimum compression or loading of springs 42 and 44 at the point where rollers 34 and 36 bear on the centered high points of the bowed portions 38 and 40, FIG. 4. Movement beyond that center point enables springs 42 and 44 to snap or trigger or release quickly and drive rollers 34 and 36 ahead of pin 12 with higher speed of rotation than provided by shaft 14, FIG. 5, and rollers 34 and 36 and shaft 20 once again are in the dwell portion of a revolution of shaft 14 and pin 12. The configuration of two rollers and two springs in the specific embodiment herein disclosed provides two dwell portions, two drive portions and two snap portions: two cycles of variable output motion are provided for one revolution of pin 12. However, the invention is applicable to configurations employing one roller and one spring, more than two springs, or more than two rollers or both. The duration of each cycle or parts of a cycle may be varied by varying the speed of the input shaft.

The valve action of the structure of FIG. 1 is shown schematically in FIGS. 6—10 where parts similar to parts in FIG. 1 bear like numbers. Immediately after springs 42 and 44 have snapped or released valving member 68 dwells in the position shown in FIG. 6 where port 72 is in communication with port 90 via chambers 102 and 104 and port 114 is in communication with port 98 via channel 110 or 112, shown in FIG. 1 and chamber 106, shown in FIG. 1. In FIGS. 6—10 only one side of member 68 is shown and the true relationship between port 114, chamber 106, channels 110 and 112 and alternately ports 90 and 98, is not pictured. Rather port 114 is shown external to the area swept by member 68 and is understood to be in communication with whichever one of ports 90 and 98 is not in communication with chamber 102.

Figure 7:
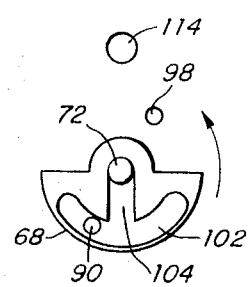
FIG. 7 is a schematic view similar to FIG. 6 showing the valving member in an interim position as it is being driven.
Figures 8, 9:
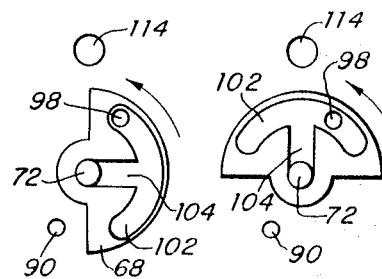
FIG. 8 is a schematic view similar to FIG. 7 showing the valving member in another dwell position immediately after the valve port interconnection have been interchanged by the snap action of the springs.
FIG. 9 is a schematic view similar to FIG. 8 showing the valving member in interior position as it is being driven.
Figure 10:
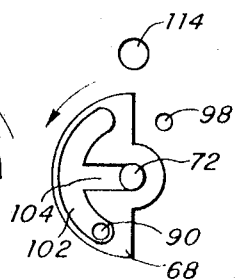
FIG. 10 is a schematic view similar to FIG. 9 showing the valving member in a dwell position similar to FIG. 1 immediately after the valve port interconnections have been interchanged by the snap action of the springs.

As pin 12 bears on pins 16 and 18 member 68 begins to rotate, FIG. 7; because of the extended arcuate shape of chamber 102, port 72 remains in communication with port 90, and port 114 remains in communication with port 98. As rollers 34 and 36 approach the position at which springs 42 and 44 are maximally compressed the leading end 120 of chamber 102 is approaching port 90. When rollers 34 and 36 pass over the center point of springs 42 and 44 and those springs release, member 68 is snapped forward in the direction of previous rotation and the leading end 120 of chamber 102 envelopes port 98 while the lagging end 122 of chamber 102 clears port 90 permitting port 90 to communicate with port 114, FIG. 8. This dwell portion continues until pin 12 once again engages rollers 34 and 36 and drives them to compress springs 42 and 44, FIG. 9. During this portion of the revolution port 114 maintains communication with port 90 and port 72 maintains communication with port 98. At the point where the leading and lagging ends 120, 122 of chamber 102 approach ports 90 and 98, respectively, springs 42 and 44 snap and rotate member 68 to the dwell position of FIG. 10.

The particular shape and arrangement of the valve structure, passages and parts shown herein are demonstrative only. Many other shapes, arrangements and motions may be utilized to effect the valving action.

Other embodiments within the skill of the art are within the following claims:

I claim:
1. Actuator apparatus for providing variable output motion in response to uniform input motion comprising:
   a first drive shaft;
   drive means carried by said first drive shaft;
   an auxiliary drive shaft coaxial with said first drive shaft;
   a pair of pins carried by said auxiliary drive shaft at diametrically opposed positions for being driven by said drive means;
   a pair of rollers mounted with said pair of pins;
   pair of springs disposed on opposite sides of said auxiliary drive shaft for being loaded by said pair of rollers during a first part of a revolution while said drive means drives said pair of pins, and for releasing during second part of a revolution to drive said pair of rollers; and,
   a valving member driven by said auxiliary drive shaft and including a housing having first, second, third and fourth valve ports.

2. The apparatus of claim 1 in which said valving member includes a first chamber connected to said first port and selectively connectable to one of said second and third ports, and a second chamber connected to said fourth port and selectively connectable to the others of said second and third ports.

3. The apparatus of claim 2 in which said valving member is driven by said auxiliary drive shaft to quickly interchange the connection of said first and fourth ports with said second and third ports upon release of said springs.

4. The apparatus of claim 3 in which said first chamber is elongated in the direction of motion of said valving member to maintain connection, with one of said second and third ports to which it is connected, as said valving member is driven during said first portion of said revolution.